United States Patent
Bosch

(10) Patent No.: US 6,803,690 B2
(45) Date of Patent: Oct. 12, 2004

(54) ELECTRIC MOTOR EXCITED BY PERMANENT MAGNETS

(75) Inventor: Volker Bosch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/343,500

(22) PCT Filed: Feb. 27, 2002

(86) PCT No.: PCT/DE02/00725

§ 371 (c)(1),
(2), (4) Date: Jan. 31, 2003

(87) PCT Pub. No.: WO03/009449

PCT Pub. Date: Jan. 30, 2003

(65) Prior Publication Data

US 2003/0151324 A1 Aug. 14, 2003

(30) Foreign Application Priority Data

Jul. 18, 2001 (DE) .......................... 101 35 019

(51) Int. Cl.⁷ .............................................. H02K 21/12
(52) U.S. Cl. ........................... 310/156.02; 310/156.01; 310/156.53; 310/154.21; 310/156.43
(58) Field of Search ....................... 310/156.02, 156.01, 310/156.53, 154.21, 156.43, 40 R, 154.11

(56) References Cited

U.S. PATENT DOCUMENTS

| | | | | |
|---|---|---|---|---|
| 4,641,080 A | * | 2/1987 | Glennon et al. .............. | 322/49 |
| 4,954,736 A | * | 9/1990 | Kawamoto et al. ..... | 310/156.21 |
| 4,973,872 A | * | 11/1990 | Dohogne .................. | 310/156.28 |
| 5,130,595 A | * | 7/1992 | Arora ........................ | 310/268 |
| 5,170,085 A | * | 12/1992 | Shinto ................... | 310/156.28 |
| 5,345,130 A | * | 9/1994 | Kliman et al. ......... | 310/156.13 |
| 5,679,995 A | * | 10/1997 | Nagate et al. ......... | 310/156.54 |
| 5,731,647 A | * | 3/1998 | Schuller et al. ............. | 310/114 |
| 6,029,336 A | * | 2/2000 | Kliman et al. ................. | 29/598 |
| 6,081,053 A | * | 6/2000 | Maegawa et al. ......... | 310/49 R |
| 6,087,751 A | * | 7/2000 | Sakai .................... | 310/156.45 |
| 6,147,428 A | * | 11/2000 | Takezawa et al. ..... | 310/156.57 |
| 6,204,587 B1 | * | 3/2001 | Torok et al. ................. | 310/181 |
| 6,323,572 B1 | * | 11/2001 | Kinoshita ............... | 310/156.07 |
| 6,342,745 B1 | * | 1/2002 | Sakai et al. ............ | 310/156.56 |
| 6,400,055 B1 | * | 6/2002 | Aoshima et al. ....... | 310/156.01 |
| 6,486,581 B2 | * | 11/2002 | Miyashita et al. ...... | 310/156.53 |
| 6,492,755 B1 | * | 12/2002 | Jones ..................... | 310/156.12 |
| 6,552,459 B2 | * | 4/2003 | Burton .................. | 310/156.08 |
| 2002/0041127 A1 | * | 4/2002 | Naito et al. ............ | 310/156.07 |

FOREIGN PATENT DOCUMENTS

| | | | | |
|---|---|---|---|---|
| DE | 3844074 | * | 12/1988 | .......... H02K/21/00 |
| DE | 38 44 074 A1 | | 7/1990 | |
| DE | 3844074 | * | 7/1990 | .......... H02K/21/14 |
| DE | 195 31 861 A | | 3/1997 | |
| DE | 19531861 | | 3/1997 | |
| EP | 0 486 448 A | | 5/1992 | |
| EP | 0 720 274 A | | 7/1996 | |
| WO | 99 12248 A | | 3/1999 | |

OTHER PUBLICATIONS

"Berichte Aus Dem Institut Fuer ..." Band 7, Volker Bosch: Elektronisch Kommutiertes Einzeispindelantriebssystem, Shaker Verlag, AaChen 2001, pp. 104–105. (English Translation is provided).

* cited by examiner

Primary Examiner—Dang Le
Assistant Examiner—Heba Y. Elkassabgi
(74) Attorney, Agent, or Firm—Michael J. Striker

(57) ABSTRACT

The electric motor with permanent-magnet excitation has a stator (1), a rotor (7) supported inside the stator and adjacent permanent magnets (8, 9, 10, 11) of opposite polarity arranged next to each other on a rotor surface facing the stator. The rotor (7) has cavities (16, 17, 18, 19) arranged within a rotor interior and indentations (12, 13, 14, 15) in the rotor surface, which are arranged so that radially oriented magnetic flux lines are not interrupted by the cavities and indentations, but magnetic flux lines oriented tangentially to the rotor surface are interrupted by the cavities and indentations so that a magnetic short circuit is formed. These indentations and cavities reduce the rotor heat capacity so that a layer of a magnetic material that forms the permanent magnets (8, 9, 10, 11) can be sprayed onto the rotor surface.

6 Claims, 1 Drawing Sheet

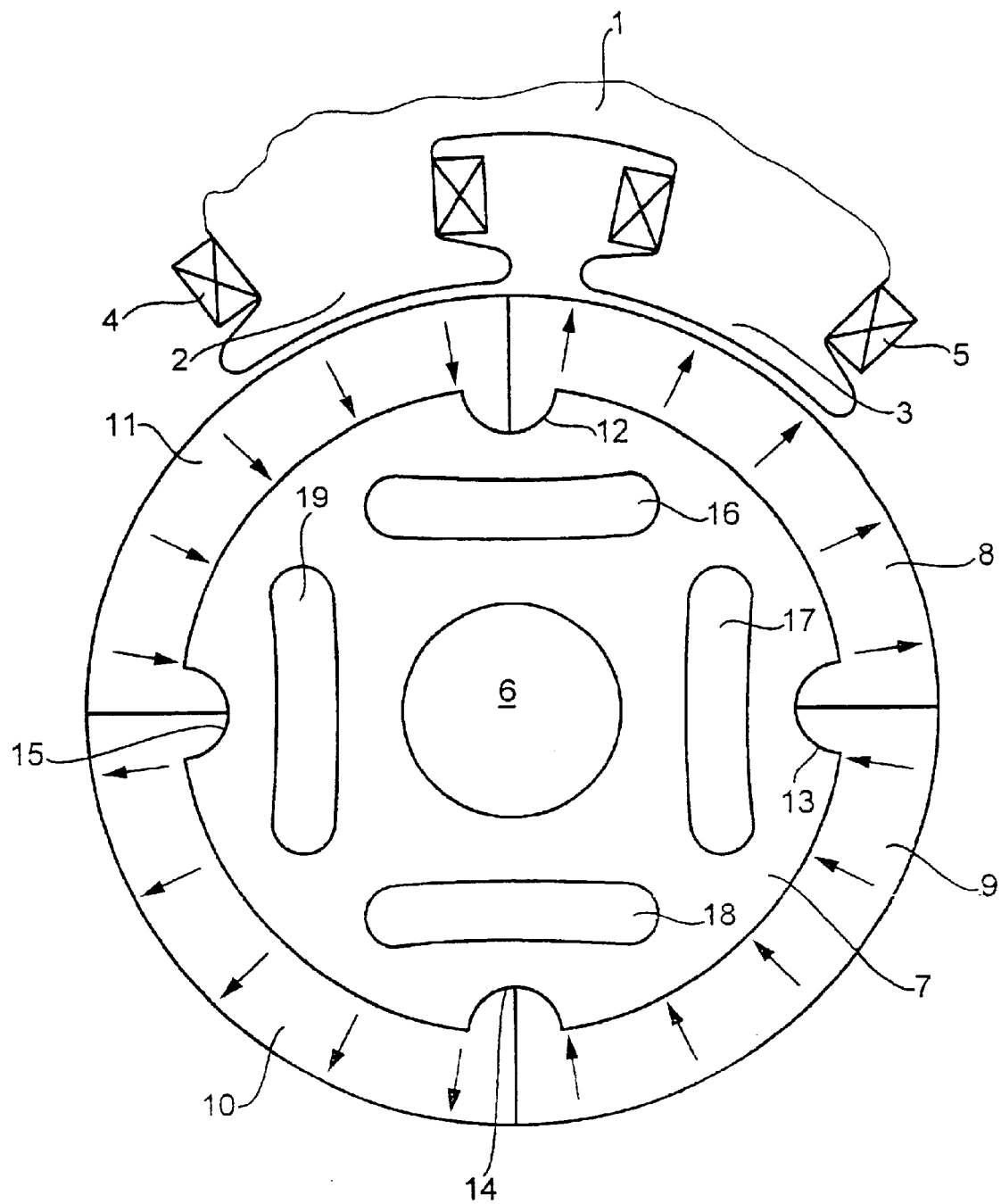

ELECTRIC MOTOR EXCITED BY PERMANENT MAGNETS

PRIOR ART

The present invention relates to an electric motor with permanent-magnet excitation, which has a rotor on whose surface, oriented toward the inside of a stator, a plurality of permanent magnets are disposed.

A permanent-magnet-excited electric motor of this kind is known for instance from U.S. Pat. No. 6,204,587 or German Patent DE 3 844 074 C2. The rotors of the electric motors described in these publications have permanent magnets on their surface, and adjacent permanent magnets have opposite polarity. As taught in particular by DE 3 844 074 C2, especially in high-speed motors, provisions must be made to absorb the centrifugal forces acting on the permanent magnets. To that end, a massive hollow cylinder is slipped onto the rotor, in such a way that it rests with its inner wall directly on the permanent magnets. This fixes the permanent magnets in their position on the rotor, and thus a fastening of the permanent magnets that is reliable even at very high rpm is achieved. Such relatively complicated provisions for fixation of the permanent magnets are required quite particularly whenever the permanent magnets have a great wall thickness, so that they can be magnetized not radially but laterally, so that a magnetic short circuit through the rotor can be dispensed with. Permanent magnets with a great wall thickness are typically made by pressing from a magnetic material. Pressed magnetic material has only slight mechanical tensile strength, however, so that bandaging of the permanent magnets is required as disclosed for instance in DE 3 844 074 C2.

The object of the invention is to disclose an elm of the type defined at the outset in which the magnetic material forming the permanent magnets can be applied in a relatively thin layer directly onto the surface of the rotor.

SUMMARY OF THE INVENTION

It is an object of the present invention to provide an electric motor of the above-described type having a stator and a rotor rotatably mounted in the stator, which has a plurality of permanent magnets disposed on a surface of the rotor oriented toward the stator, in which the magnetic material forming the permanent magnets can be applied in a relatively thin layer directly onto this surface of the rotor.

This object and others, which will be made more apparent hereinafter, are attained in an electric motor with permanent-magnet excitation, which comprises a stator, a rotor that is supported rotatably inside the stator and has a surface facing the stator and a number of permanent magnets arranged adjacent to each other on the rotor surface with adjacent permanent magnets magnetized in opposite directions radially with respect to the rotor surface;

wherein the rotor is provided with cavities arranged within its interior and with indentations in the rotor surface, which are placed and dimensioned so that magnetic flux lines oriented radially to the rotor surface are not interrupted by them so that no short circuit is thereby formed via the rotor, but magnetic flux lines oriented tangentially or nearly tangentially to the rotor surface are interrupted by them so that a short circuit is thereby formed via the rotor; and wherein the cavities in the interior of the rotor are positioned below respective transitions between adjacent permanent magnets magnetized in the opposite directions, the cavities extend in a direction of a longitudinal axis of the rotor and the cavities widen transverse to the longitudinal axis of the rotor.

The coefficients of thermal expansion of the iron of the rotor and of the magnetic material in fact differ quite sharply, and the high thermal capacity of the rotor leads to rapid cooling of the magnetic material applied to the rotor, for instance by spraying. As a result, there is the danger that the applied magnetic material will tear. This unwanted effect can be avoided by the provision according to the invention for reducing the thermal capacity of the rotor, by providing cavities in the interior of the rotor. Since precisely the exciter flux, which extends radially outward from the permanent magnets of the rotor to the air gap between the rotor and the stator, increases the available torque of the motor, the recesses are placed such that they precisely do not interrupt the lines of the magnetic flux in the radial direction to the surface of the rotor.

Since the lines of the magnetic flux that are oriented tangentially or nearly tangentially to the surface of the rotor and that form a short circuit via the rotor reduce the available torque of the rotor, the cavities and indentations are placed and dimensioned such that they interrupt lines of the magnetic flux oriented tangentially or nearly tangentially to the surface of the rotor.

The permanent magnets advantageously comprise respective layers of plastic-bonded magnetic material sprayed onto the surface of the rotor next to each other in a particularly preferred embodiment of the present invention.

In another preferred embodiment the respective indentations extend in the direction of the longitudinal axis of the rotor and are formed in corresponding regions of the rotor surface below the respective transitions between the adjacent permanent magnets of opposite polarity.

The centrifugal strength of the rotor can be increased by providing that the indentations having a dovetail cross section. This is because the dovetail shape of the indentations allows wedging of the permanent magnets, so that they are secured not only against a rotary motion but also against a radial motion.

In preferred embodiments of the electric motor a non-magnetic material for balancing the rotor, especially balancing cement, fills the cavities within the rotor interior.

The rotor advantageously comprises layered iron sheets.

DESCRIPTION OF AN EXEMPLARY EMBODIMENT

The sole FIGURE of the drawing shows a cross section through an electric motor, whose stator 1 is shown only in part, with two poles 2, 3 and the associated windings 4, 5. A rotor 7 disposed on a motor shaft 6 is supported rotatably inside the stator 1. The rotor 7 preferably comprises a stack of iron sheets layered on one another. The stator 1 can also comprise iron sheets layered on one another. The rotor 7 and the stator 1 are preferably stamped out of a stack of metal sheets in a single operation.

The electric motor shown only in part is a permanent-magnet-excited three-phase synchronous motor or a brushless direct-current motor. The rotor 7 is therefore coated on its surface with permanent magnets 8, 9, 10, and 11. In the exemplary embodiment shown, in order to make four magnet poles, four permanent magnets 8, 9, 10, and 11 are applied to the surface of the rotor 7. The permanent magnets adjacent to one another, e.g. magnets 9 and 10, are magnetized, as indicated by arrows, in opposite directions radially to the surface of the rotor 7. The four permanent magnets 8, 9, 10, 11 are formed by respective layers of a preferably plastic-bonded magnetic material (such as NdFeB) sprayed directly onto the surface of the rotor 7, which surface together with the stator 1 forms an air gap. The iron rotor 7 forms the short-circuit yoke for the magnetic flux of the permanent magnets 8, 9, 10, 11.

The coefficients of thermal expansion of the magnetic material and of the iron material of the rotor 7 are quite different from one another. Moreover, the thermal capacity of the rotor 7, if the rotor is entirely a solid material, is quite high. For the magnetic material sprayed onto the rotor 7, there is therefore the risk, from overly rapid cooling because of the high thermal capacity of the rotor 7 located under it, that the sprayed-on magnetic layer will tear. To prevent this, the thermal capacity of the rotor yoke is reduced very sharply, by providing that indentations 12, 13, 14, 15 are let into the surface of the rotor 7 and/or cavities 16, 17, 18, 19 are provided within the interior of the rotor 7. These indentations and cavities 12–19 bring about a sharp reduction in the thermal capacity of the rotor material, thereby preventing the magnetic material sprayed onto the rotor 7 from cooling overly rapidly and tearing as a result.

Respective indentations 12, 13, 14, and 15 in the surface of the rotor 7, which extend in the direction of the longitudinal axis of the rotor 7, perpendicular to the plane of the drawing, are placed below the corresponding transitions between adjacent, opposite-polarity permanent magnets 8, 9, 10, 11. As disclosed in *"Berichte aus dem Institute für elektrische Maschinen und Antriebe"* [Reports from the Institute for Electrical Machines and Drive Mechanisms], Vol. 7, Volker Bosch: *Elektronisch kommutiertes Einzelspindelantriebssystem* [Electronically Commutated Single-Spindle Driver System], Shaker Verlag, Aachen 2001, this placing of the indentations is chosen so that lines of the magnetic flux oriented tangentially or nearly tangentially to the surface of the rotor and forming a short circuit via the rotor are interrupted by these indentations. As a result, lines of magnetic flux oriented tangentially in the air gap between the rotor 7 and the stator 1, which weaken the torque of the motor, are blocked. Conversely, the magnetic flux lines oriented radially to the surface of the rotor 7 are not blocked, because they increase the available torque of the motor. In accordance with these aspects, the respective cavities 16, 17, 18, 19 within the interior of the rotor 7 and also extending in the direction of the longitudinal axis of the rotor 7 are placed and dimensioned below the corresponding transitions between adjacent, opposite-polarity permanent magnets 8, 9, 10, 11.

An optimal barrier for magnetic flux lines extending tangentially or nearly tangentially to the rotor surface is formed by cavities 16, 17, 18, 19, which have a slot-like cross section extending transversely to the rotor longitudinal axis. Instead of providing only one cavity 16, 17, 18, 19 below each transition between two adjacent permanent magnets, as shown here in the drawing, a plurality of slot-like cavities, staggered radially, for instance, can also be let into the rotor 7.

The centrifugal resistance of the rotor can be increased by providing that the indentations 12, 13, 14, and 15 in the surface of the rotor 7 have a dovetail cross section. This is because the dovetail shape of the recesses 12, 13, 14, and 15 enables wedging of the permanent magnets 8, 9, 10, and 11, so that they are secured not only against a rotary motion but also against a radial motion.

Nonmagnetic material ("balancing cement") can be placed in the cavities 16, 17, 18, 19 within the interior of the rotor 7 in particular, in order to compensate for an imbalance of the rotor 7.

What is claimed is:

1. An electric motor with permanent-magnet excitation, which comprises a stator (1), a rotor (7) supported inside said stator (1) so as to be rotatable relative to said stator, said rotor (7) having a rotor surface facing said stator (1), and a plurality of permanent magnets (8, 9, 10, 11) arranged adjacent to each other on said rotor surface with adjacent permanent magnets magnetized in opposite directions radially with respect to the rotor surface;

wherein said rotor (7) is provided with cavities (16, 17, 18, 19) arranged within an interior of said rotor (7) and with indentations (12, 13, 14, 15) in said rotor surface, said cavities and said indentations are placed and dimensioned so that magnetic flux lines oriented radially to said rotor surface are not interrupted by said cavities and said indentations whereby a short circuit is not thereby formed via said rotor (7), but magnetic flux lines oriented tangentially or nearly tangentially to said rotor surface are interrupted by said cavities and said indentations whereby a short circuit is thereby formed via said rotor (7); and wherein said cavities (16, 17, 18, 19) in said interior of said rotor are positioned below respective transitions between said adjacent permanent magnets (8, 9, 10, 11) magnetized in said opposite directions, said cavities (16, 17, 18, 19) extend in a direction of a longitudinal axis of said rotor and said cavities (16, 17, 18, 19) widen transverse to the longitudinal axis of the rotor (7).

2. The electric motor as defined in claim 1, wherein said permanent magnets (8, 9, 10, 11) consist of respective layers of plastic-bonded magnetic material arranged next to each other on said rotor surface.

3. The electric motor as defined in claim 1, wherein said indentations (12, 13, 14, 15) extend in said direction of said longitudinal axis of said rotor (7) and are formed in corresponding regions of said rotor surface below said respective transitions between said adjacent permanent magnets (8, 9, 10, 11) of opposite polarity.

4. The electric motor as defined in claim 3, wherein said indentations (12, 13, 14, 15) in said rotor surface have dovetail cross-sections.

5. The electric motor as defined in claim 1, further comprising
nonmagnetic material for compensating imbalance of said rotor (7), and wherein said nonmagnetic material fills said cavities (16, 17, 18, 19) located within said interior of said rotor.

6. The electric motor as defined in claim 1, wherein said rotor (7) comprises a plurality of layered iron sheets.

* * * * *